MICROWAVE HYBRID JUNCTION CIRCUIT AND FREQUENCY TRANSLATORS CONSTRUCTED THEREFROM

Filed May 27, 1968

INVENTOR.
John C. Hoover
Stephen C. Volpone, Jr.
BY Flehr, Hohbach, Test, Albritton & Herbert
Attorneys // United States Patent Office 3,562,651

Patented Feb. 9, 1971

3,562,651

MICROWAVE HYBRID JUNCTION CIRCUIT AND FREQUENCY TRANSLATORS CONSTRUCTED THEREFROM

John C. Hoover, Los Altos, and Stephen C. Volpone, Jr., Mount View, Calif., assignors to Watkins-Johnson Company, Palo Alto, Calif., a corporation of California Filed May 27, 1968, Ser. No. 732,210

Int. Cl. H03d *7/02, 7/14*

U.S. Cl. 325—446 7 Claims

ABSTRACT OF THE DISCLOSURE

A four port hybrid circuit for use at microwave frequencies having one input port with a tunable bandpass characteristic, and which splits signals out of phase to balanced output ports, and which has another input port which directly couples inphase to the output ports. The input ports are isolated from each other. Novel frequency translating devices using the hybrid junction are also disclosed.

BACKGROUND OF THE INVENTION

This invention relates to tunable microwave devices and more particularly to a hybrid junction circuit incorporting ferrites and having tunable frequency response, and to frequency translators constructed from the same.

Heretofore, frequency selective devices for these purposes have commonly employed tunable waveguide resonators which have incorporated a mechanically movable component for determining the frequency of oscillation. Such waveguide resonators are bulky, costly and require inconvenient mechanisms for their operation. Additionally, such waveguide resonators have been limited to a narrow frequency range over which they can be tuned, due to restraints in the physical size and dimensions of the cavity and the oscillation modes available. There is, therefore, a need for new and improved tunable microwave devices.

OBJECTS AND SUMMARY OF THE INVENTION

It is a general object of the present invention to provide required tunable microwave devices which will overcome the above limitations and disadvantages.

Another object of the invention is to provide tunable microwave devices which can be electrically tuned by the use of magnetic biasing field interacting with a magnetically active material.

Another object of the invention is to provide a tunable microwave device of the above character which is particularly suitable as frequency translators to obtain mix or discriminator functions and which also provides a bandpass property so that the signal bandwidth from one port can be preselected.

Another object of the invention is to provide a tunable microwave device of the above character which is capable of multi-octave tuning over a broad frequency range.

In general, the present invention consists of a hybrid circuit incorporating ferrimagnetically resonant material positioned in a DC magnetic biasing field. Means forming electrically conductive coupling loops are arranged about the ferrimagnetic material so that the magnetic fields produced by the loops are oriented orthogonally to each other and to the biasing field. The loops are coupled to each other through the resonance of the ferrimagnetic material. One loop, hereinafter termed the signal loop, connects an input signal source at a first port to ground. The midpoint of the other loop is tapped and connected to a second port, and its ends are connected to third and fourth ports to form a symmetrical connection with respect to the second port. The second port receives local oscillator (LO) signal. The third and fourth ports are balanced output ports from the device while the first and second ports are considered to be the signal end LO input ports respectively. This device forms a four port hybrid junction circuit which is tunable by varying the strength of the DC magnetic biasing field. In another form of the invention, the third and fourth ports terminate in series connected diodes, and the resulting device forms a balanced mixer or discriminator.

These and other objects and features of the invention will become apparent from the following description and claims when taken in conjunction with the accompanying drawings.

DETAILED DESCRIPTION OF THE INVENTION

Figures 1, 2, 4:
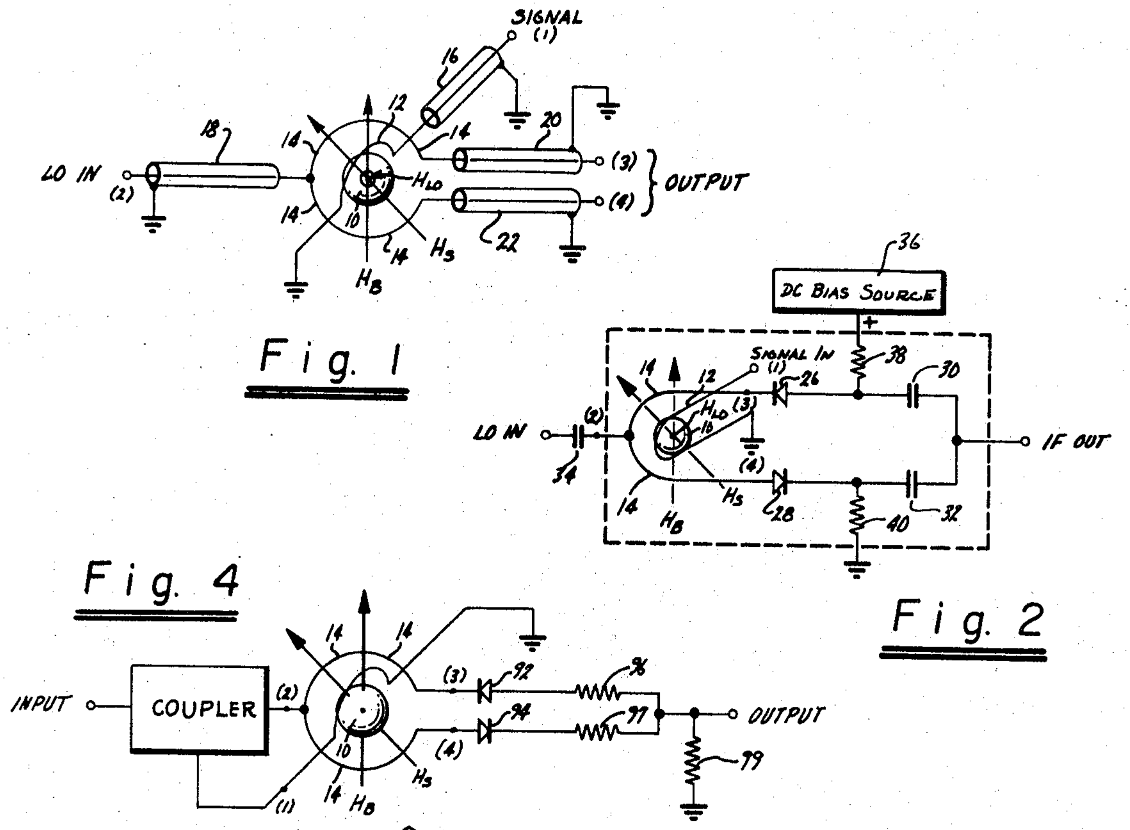
FIG. 1 is a schematic diagram of a hybrid junction circuit constructed in accordance with the invention.
FIG. 2 is a schematic diagram of a mixer circuit utilizing the hybrid circuit in FIG. 1 and constructed in accordance with the invention.
FIG. 4 is a schematic diagram of a tunable discriminator constructed in accordance with the invention.

Referring to FIG. 1, there is shown a four port hybrid junction circuit of the invention, the operation of which centers about the magnetic interaction with a body or resonator 10 of magnetically resonant material.

Material suitable for use as magnetic resonator 10 is dependent upon the expected frequency of operation. For microwave frequencies satisfactory materials include those from the rare-earth-iron garnet group typified by yttrium-iron garnet (YIG) having low magnetic losses, low conductivity and a distinct magnetic resonance. Means (not shown) is provided for forming a substantially uniform magnetic biasing field, $H_B$, and preferably consists of a suitable current controlled electromagnet having a gap in which the material is positioned. Electromagnetic includes means for varying the strength of the magnetic field in the gap to thereby change the resonant frequency of the material 10.

A first port (1) is connected to a conductor forming a first coupling loop 12 which is terminated at its other end to a suitable ground. Current in loop 12 creates a magnetic field, designated by vector $H_S$ which is preferably arranged orthogonal to the biasing magnetic field $H_B$.

Means forming second (2), third (3), and fourth (4) ports are also provided and are connected to a conductor forming a second coupling loop 14. Current flowing in loop 14 creates a magnetic field $H_{LO}$ which also magnetically couples to resonator 10. Loop 14 is arranged so that its field $H_{LO}$ is orthogonal to magnetic vectors $H_S$ and preferably is orthogonal to $H_B$. Accordingly, loops 12 and 14 are magnetically decoupled as a result of their geometrical disposition and are only coupled through the resonance of material 10. Ports (3) and (4) are connected at the ends of loop 14 and conductor means is provided for connecting port (2) to the midpoint of loop 14 to form a symmetrical parallel branch with respect to ports (3) and (4) so that signals applied to port (2) appear equally in phase at ports (3) and (4) by virtue of the direct electrical connection. As shown, electrical connections to ports (1), (2), (3), and (4) are made by suitable transmission lines such as coaxial cables 16, 18, 20 and 22, respectively. At the resonance of resonant body 10 in field $H_B$, a signal applied to port (1) is coupled by the resonant body from loop 12 to loop 14 and thence to output ports (3) and (4) and appears at ports (3) and (4) with equal amplitude and 180° phase difference. This transfer of energy from port (1) to ports (3) and (4) will be a maximum at the resonance frequency of body 10 and will have a transferred signal-to-frequency response typical of a bandpass filter utilizing such magnetically resonant material. At the midpoint of loop 14 to which port (2) is connected, a voltage null exists for signals introduced at port (1) so that port (2) is isolated from signals originating at port (1). Loop 14 is symmetrical about a plane passing through the body 10 of ferrimagnetic material so that the magnetic effect of portions or arms above and below this plane will have equal and opposite effect to thereby cancel out and therefore not couple through resonator 10.

Signals (LO) inserted at port (2) divide and appear in-phase at ports (3) and (4) and create in-phase currents flowing in opposite directions from port (2) so that the net magnetic effect of these currents in loop 14 cancels out and causes no net coupling to the resonator 10. Thus, the split of signal from port (2) to ports (3) and (4) is frequency insensitive and is not determined by the magnetic resonance of body 10.

In summary, the four port hybrid junction circuit described has one input port (1) with a tunable bandpass filter characteristic and splits input signals in opposite phases to two output ports (3) and (4). The other (LO) input port (2) splits signals in-phase to the output ports and is not coupled through the resonator and ports (1) and (2) are decoupled from each other. This circuit is reciprocal in that in-phase signals applied to ports (3) and (4) combine at port (2) while being isolated from port (1), while out-of-phase signals applied to ports (3) and (4) cancel at port (2) and combine at port (1) at the resonant condition of body 10.

Referring to FIG. 2, there is shown a balanced mixer constructed from the hybrid junction of FIG. 1 and like parts have accordingly been given the same reference numbers except that the coaxial cables 18 through 22 have been omitted for clarity. Output ports (3) and (4) are connected in series respectively to mixer diodes or diode junctions 26, 28 and DC blocking capacitors 30, 32, the outputs of which are connected together to form an IF output. Port (2) is series connected through a DC blocking capacitor 34 to local oscillator input (LO in). The diodes are preferably of the type employing a metal-to-semiconductor (Shottky) barrier having improved noise figure and a lower conversion loss, and are characterized by providing a non-linear mixing function. For this purpose, it is preferred that they be operated in the conduction region and they are accordingly biased by a suitable biasing current from a source 36 through biasing network consisting of resistors 38 and 40. As shown, the bias circuit consists of resistor 38, diode 26, diode 28, and resistor 40 connected in series and DC isolated from the rest of the circuit by capacitors 30, 32, and 34. The diodes are connected in a sense which permits them to be forward biased into conduction. In the conduction, the diodes operate with improved performance, particularly with respect to IM rejection and conversion loss, RF bypass capacitance indicated by the capacitors 42, 44 can be provided to eliminate the RF signal from the output and can consist of physical capacitors of small value, or can result from the operation of stray capacitance developed because of the proximity of circuit leads to ground plane.

| | |
|---|---|
| DC bias (+10 volts) | Resonator **10** |
| Resistor **38** (10 KΩ) | Material—YIG |
| Resistor **40** (1 KΩ) | Diameter of sphere—.038" |
| Capacitors **30**, **32** (2,000 pf.) | Line width—>1 oe. |
| Capacitance **42**, **44** (5 pf.) | Applied field $H_B$—1000 gauss |

Figure 3:
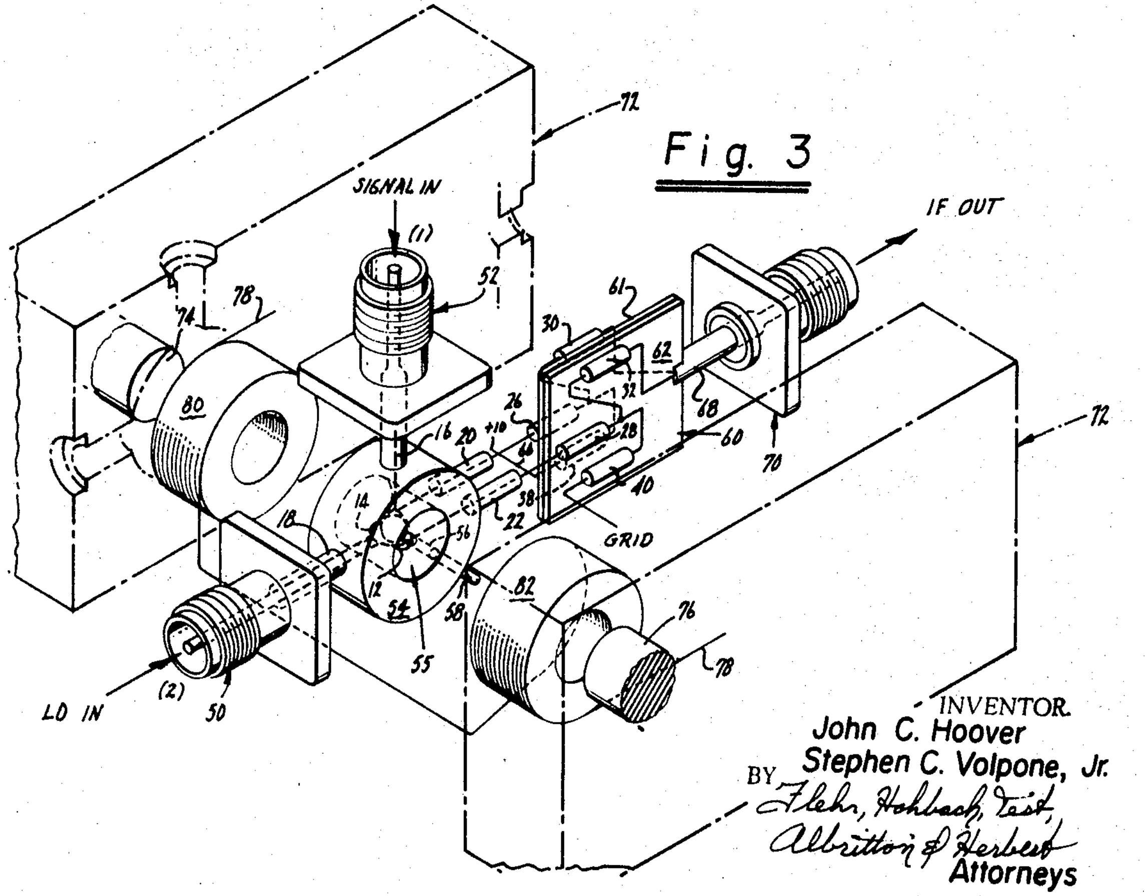
FIG. 3 is an exploded isometric view of apparatus realizing the mixer circuit of FIG. 2 and constructed in accordance with the invention.

Other circuit values and characteristics of an S-band device are given in connection with the embodiment of FIG. 3.

FIG. 3 illustrates a physical realization of the circuit of FIG. 2 in a device for use in S-band. Thus, LO input port (2) and a signal input port (1) consist of suitable coaxial connectors 50, 52 mounted through coaxial cables 16, 18 to an annular filter block 54 having a central aperture 55, wherein the loops 12 and 14 are contained. Block 54 is constructed of a suitable nonmagnetic rigid material such as the polyimide polymer sold under the trade name Vespel. All surfaces of filter block 54 are provided with a conductive coating to form a reference ground plane for the microwave circuit which it contains.

As shown, the body 10 consists of a garnet sphere which is inserted and supported through a hole 56 in the side of the block 54 on an alumina ($Al_2O_3$) rod 58 to which it is fastened with a suitable adhesive such as an epoxy cement.

The outer conductor of the LO input coaxial cable (UT–85) terminates on the conductive coating of filter block 54 while the inner conductor passes coaxially through a conductive passageway in the block and into aperture 55 wherein it connects to loop 14 which surrounds body 10. The output of loop 14 is connected through the central conductors of coaxial cables 20, 22 (UT–47) to diodes 26, 28 mounted on opposite sides of a circuit board 60 consisting of flat ceramic strips 61, 62 having a common internal ground plane 64. A bias lead 66 is connected to the circuit board and thence through resistors 38, 40 to the respective diodes. The output of the diodes is connected through capacitors 30, 32 to the input pin 68 of a coaxial connector 70.

Similarly, the outer conductor of cable 16 (also UT–85) connects to reference ground on the surface of filter block 54, while its center conductor passes through a hole in the filter block into aperture 55 wherein it forms loop 12 and terminates to reference ground on the conductive coating at the opposite side.

The entire circuit is housed in a magnetic enclosure consisting of a two-piece housing 72 made of a magnetic material such as that sold under the trade name Hypernick. Magnetic poles 74, 76 are press fitted into the sidewalls of the magnetic housing and are adapted to lie into close coupled relation on each side to thereby close the aperture 55 in the filter block. Suitable current leads 78 and coils 80, 82 are provided for forming an electromagnet to supply the field $H_B$ between the pole pieces, the return path being through the housing 72 to thereby permit the resonator body 10 to be selectively biased by the field $H_B$ to an appropriate operating frequency.

In operation, the local oscillator (LO input) is coupled directly to the mixer diodes by simple power splitting effect through the arms of signal loop 14. At resonance, the input signal (S) is coupled by the action of the YIG resonator to loop 14 and thence each of the diodes where it combines together with the LO signal. Signal (S) is coupled in such a way as to cause 180° phase difference between the signals appearing at each diode. Since 180° phase difference exists between the signals at each of ports (3) and (4) a signal null will be also present at both the local oscillator input port (2) and the IF output port. The local oscillator divides in equal phase to each mixer arm, and, accordingly, does not couple to the signal port through the resonator since the magnetic effect of each arm of loop 14 is oppositely directed. RF bypass capacitors 42, 44 consist of distributed parallel plate capacitance of small area. The magnetic structure consists of two 2.5 ohm coils mounted on pole pieces 0.190 inch diameters, the gap between which being approximately 0.12 inch.

The mixer of the present invention exhibits the characteristics of a tunable bandpass filter with respect to the input signal into port (1) and is capable of multi-octave band width operation since the ferrimagnetic resonator can be biased to tune across a wide frequency band. By way of example, one unit was tunable from approximately 1.8 to 12.4 gHz. Furthermore, excellent isolation between LO (2) and signal (1) ports is inherent in the design and only depends on the accuracy of the physical construction maintaining loops 12 and 14 orthogonal to each other.

FIG. 5 shows a frequency or FM discriminator with electrically tunable center frequency which is constructed from the hybrid circuit of FIG. 1 and like parts have been given the same reference numbers. In this circuit a portion of the input signal is connected by a coupler 90 (such as a 3 db hybrid coupler) to the local oscillator port (2) and the remainder is coupled to the signal port (1). The signals arriving at the video detector diodes 92 and 94 are then composed of the vector sum of the signal transmitted from port (1) via resonator 10 and the signal applied at port (2). Because of the inherent phase properties of the resonator with proper phase lengths, the signals will reinforce at one diode below the ferrimagnetic resonance and will reinforce at the other diode above ferrimagnetic resonance, the net result appearing across signal summing resistors 96, 97, 99 being the typical freqeuncy response or S-curve of a discriminator.

What is claimed is:

1. A hybrid circuit comprising means forming a substantially uniform magnetic biasing field having a magnetic vector $H_B$ oriented in a predetermined direction, a magnetically resonant material disposed in said biasing field, means forming a first conductive signal loop about said magnetically resonant material, said loop being oriented in a plane the normal of which corresponds to a magnetic vector $H_S$ and is orthogonal to said biasing field vector $H_B$ said loop having an input consisting of a terminal and a ground defining a first port to said circuit, said signal loop being terminated at its other end to ground so that a signal applied to said first port passes through said loop to ground, means forming a second conductive loop about said magnetically resonant material, said second loop being oriented in a plane the normal of which defines a magnetic vector $H_{LO}$ which is orthogonal to both said biasing magnetic vector $H_B$ and said signal magnetic vector $H_S$ said second loop terminating at each end in transmission lines which are balanced with respect to each other to form third and fourth ports of the circuit and consisting of a terminal at the respective end of said line and ground, conductor means symmetrically connected to said loop at its midpoint to form a symmetrical connection with respect to said third and fourth ports, said conductor means and ground defining a second port, whereby signals applied to said second port appear equally and in phase at said third and fourth ports, and a signal applied to said first port is selectively transferred through said ferrimagnetic material to said third and fourth ports equally and in opposite phase.

2. A hybrid circuit as in claim 1 wherein said second loop is symmetrically disposed about said magnetically resonant material.

3. A hybrid circuit as in claim 1 wherein said magnetically resonant material is a body having spherical symmetry.

4. A hybrid circuit as in claim 1 wherein said magnetically resonant material is a solid body of YIG.

5. A balanced mixer comprising a hybrid circuit as in claim 1 further including a nonlinear mixing element connected in series in each conductive transmission path to said third and fourth ports, and means interconnecting said third and fourth ports to form a common output.

6. A balanced mixer as in claim 5 wherein said mixing elements are diode junctions and further including means biasing said diode junctions into conduction.

7. A tunable discriminator comprising a hybrid circuit as in claim 1 further including means interconnecting said first and second ports to a source of signal, and first and second diodes connected in series with each of said third and fourth ports in opposite conduction direction respectively, and a signal summing network connecting the output side of the diodes to a common output terminal.

References Cited

UNITED STATES PATENTS

| | | | |
|---|---|---|---|
| 2,962,676 | 11/1960 | Marie | 332—51 |
| 3,098,974 | 7/1963 | Duncan | 325—448 |
| 3,246,245 | 4/1966 | Turner | 325—442 |
| 3,327,220 | 6/1967 | Podell | 325—446 |
| 3,346,813 | 10/1967 | Anderson et al. | 325—448 |

RICHARD MURRAY, Primary Examiner

B. V. SAFOUREK, Assistant Examiner

U.S. Cl. X.R.

325—448; 332—51; 333—1.1